United States Patent
Ridell (10) Patent No.: US 11,401,648 B2
(45) Date of Patent: Aug. 2, 2022

(54) WATER USE OPTIMIZATION IN A DEVICE UTILIZING WATER FOR A CLEANING PROCEDURE

(71) Applicant: ORBITAL SYSTEMS AB, Malmö (SE)

(72) Inventor: Michael Ridell, Staffanstorp (SE)

(73) Assignee: ORBITAL SYSTEMS AB, Malmo (SE)

( * ) Notice: Subject to any disclaimer, the term of this patent is extended or adjusted under 35 U.S.C. 154(b) by 0 days.

(21) Appl. No.: 16/494,347

(22) PCT Filed: Mar. 12, 2018

(86) PCT No.: PCT/SE2018/050231
§ 371 (c)(1),
(2) Date: Sep. 16, 2019

(87) PCT Pub. No.: WO2018/169471
PCT Pub. Date: Sep. 20, 2018

(65) Prior Publication Data
US 2020/0129038 A1  Apr. 30, 2020

(30) Foreign Application Priority Data
Mar. 15, 2017  (SE) .................................... 1750306-1

(51) Int. Cl.
*A47L 15/00*  (2006.01)
*A47L 15/42*  (2006.01)
(Continued)

(52) U.S. Cl.
CPC ........ *D06F 39/006* (2013.01); *A47L 15/0047* (2013.01); *A47L 15/4291* (2013.01);
(Continued)

(58) Field of Classification Search
CPC ............. A47L 15/0047; A47L 15/4291; A47L 2501/01; A47L 2501/03; A47L 2401/11;
(Continued)

(56) References Cited

U.S. PATENT DOCUMENTS 5,293,654 A * 3/1994 Castwall ................... E03C 1/00
4/597
7,371,288 B2 * 5/2008 Cho ..................... A47L 15/0021
134/25.2
(Continued)

FOREIGN PATENT DOCUMENTS

EP  3128065 A1  8/2017

OTHER PUBLICATIONS

International Search Report on application No. PCT/SE2018/050231 dated May 25, 2018.
(Continued)

*Primary Examiner* — Duy Vu N Deo
*Assistant Examiner* — Christopher Remavege
(74) *Attorney, Agent, or Firm* — Moser Taboada (57) ABSTRACT

The present inventive concept relates to a method for optimizing water usage in a device utilizing water for a group of cleaning procedures, wherein the device comprises a sensor arrangement (518) and a data processing device, wherein the method comprises the steps of: determining a first substance content (400*a*) of first cleaning phase water from a first cleaning phase of the cleaning procedure (428) using the sensor arrangement (518); in the data processing device, receiving data comprising a target substance content interval requirement (844) of at least one of a plurality of cleaning phases (314); in the data processing device, comparing the first substance content to the target substance content interval requirement (844); and forming cleaning phase water to be used in the at least one of the plurality of
(Continued)

cleaning phases (314) by transferring the first cleaning phase water to the at least one of the plurality of cleaning phases (314) based on the comparison.

8 Claims, 4 Drawing Sheets

(51) Int. Cl.
  *D06F 103/20* (2020.01)
  *D06F 39/00* (2020.01)
  *D06F 33/37* (2020.01)
  *D06F 105/42* (2020.01)
  *D06F 39/08* (2006.01)

(52) U.S. Cl.
  CPC .......... *D06F 33/37* (2020.02); *A47L 2501/01* (2013.01); *A47L 2501/03* (2013.01); *D06F 39/083* (2013.01); *D06F 2103/20* (2020.02); *D06F 2105/42* (2020.02)

(58) Field of Classification Search
  CPC ............... A47L 2401/023; D06F 33/00; D06F 2202/02; D06F 2204/086; D06F 34/22; D06F 39/083; D06F 2204/082; D06F 2204/084; D06F 39/10; C02F 1/008; C02F 2209/10; C02F 2307/12; C02F 2103/002; C02F 2209/11; C02F 2303/16
  See application file for complete search history.

(56) References Cited

U.S. PATENT DOCUMENTS

| | | | | |
|---|---|---|---|---|
| 8,043,437 | B1* | 10/2011 | Delgado | A47L 15/4248 134/18 |
| 9,115,454 | B2* | 8/2015 | Pollett | D06F 33/46 |
| 9,956,512 | B2* | 5/2018 | Mahdjoubi Namin | E03C 1/00 |
| 10,219,674 | B2* | 3/2019 | Lundberg | A47L 15/0021 |
| 2007/0199868 | A1 | 8/2007 | Volpe | |
| 2010/0043129 | A1* | 2/2010 | Platteel | E03B 1/04 4/300 |
| 2010/0223738 | A1 | 9/2010 | Kim | |
| 2010/0300487 | A1* | 12/2010 | Rolek | A47L 15/0005 134/10 |
| 2010/0300501 | A1* | 12/2010 | Bohac | A47L 15/4297 134/56 D |
| 2010/0307973 | A1* | 12/2010 | Grcevic | B01D 61/145 210/639 |
| 2011/0146800 | A1 | 6/2011 | Jallon et al. | |
| 2012/0138094 | A1* | 6/2012 | Delgado | A47L 15/4244 134/18 |
| 2012/0145195 | A1* | 6/2012 | Buser | A47L 15/4285 134/18 |
| 2012/0266387 | A1* | 10/2012 | Pollett | D06F 39/02 8/137 |
| 2013/0126440 | A1* | 5/2013 | Prause | C02F 1/008 210/745 |
| 2014/0366916 | A1* | 12/2014 | Lundberg | A47L 15/4291 134/18 |
| 2016/0168776 | A1* | 6/2016 | Xu | C02F 1/008 8/137 |
| 2017/0121200 | A1* | 5/2017 | Brozell | C02F 9/00 |
| 2017/0144904 | A1* | 5/2017 | Shu | D06F 39/083 |

OTHER PUBLICATIONS

European Patent Office Communication on application No. 18767673.9, PCT/SE2018050231 dated Jul. 24, 2019.

* cited by examiner

WATER USE OPTIMIZATION IN A DEVICE UTILIZING WATER FOR A CLEANING PROCEDURE

TECHNICAL FIELD

The inventive concept described herein generally relates to the field of water recirculation. More particularly, concepts for water use optimization in devices utilizing water for a cleaning procedure are disclosed.

BACKGROUND

In many parts of the world, water is becoming a scarce commodity. Consequently, systems for purification and recycling of water has found applications across many fields. For example, the treatment and recycling of graywater from cleaning procedures (e.g., waste water generated by carwashes, dishwashers, showers, and laundry machines) has been explored and put into practice during the past decades. Conventional devices recycling such graywater can be effective, but are often based on a primitive setup directing the used water along a pre-determined path. In addition, such devices are often adapted solely for a single application, typically in a household setting. There is therefore a need to improve water use in devices utilizing water for cleaning procedures in terms of cost effectiveness, ease of installation and use, customizability, and adaptation to multiple applications.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by a method for optimizing water usage in a device utilizing water for a group of cleaning procedures, each cleaning procedure comprising a plurality of cleaning phases each having a substance content interval requirement with respect to a number of substance levels and each using cleaning phase water having a substance content with respect to the number of substance levels, wherein the device comprises a sensor arrangement and a data processing device, wherein the method comprises the steps of: determining a first substance content of first cleaning phase water from a first cleaning phase of the cleaning procedure using the sensor arrangement; in the data processing device, receiving data comprising a target substance content interval requirement of at least one of the plurality of cleaning phases; in the data processing device, comparing the first substance content to the target substance content interval requirement; and forming cleaning phase water to be used in the at least one of the plurality of cleaning phases by transferring the first cleaning phase water to the at least one of the plurality of cleaning phases based on the comparison.

The first cleaning phase water may be transferred to the at least one of the plurality of cleaning phases if the first substance content is within the target substance content interval requirement.

The device may further comprise an external water path in liquid communication with an external water source, wherein the step of forming the cleaning phase water to be used in the at least one of the plurality of cleaning phases further comprises the sub-step of: if the first substance content is within a first interval outside of the target substance content interval requirement, combining the first cleaning water with external water from the external water source in order to form a first external and first cleaning phase water combination (first EFCPWC), wherein the external water has a different substance content with respect to the first substance content, and wherein a first EFCPWC substance content of the first EFCPWC is within the target substance content interval requirement.

The device may further comprise a water treatment arrangement, wherein the step of forming the cleaning phase water to be used in the at least one of the plurality of cleaning phases further comprises the sub-step of: if the first substance content is within a second interval outside of the target substance content interval requirement, treating the first cleaning phase water in the water treatment arrangement in order to bring the first substance content towards and/or within the target substance content interval requirement.

The step of forming the cleaning phase water to be used in the at least one of the plurality of cleaning phases may further comprise the sub-step of: if the first substance content is within a third interval outside of the target substance content interval requirement, combining the first cleaning water with external water from the external water source in order to form a second EFCPWC, wherein the external water has a different substance content with respect to the first substance content, and wherein a second EFCPWC substance content of the second EFCPW is outside of the target substance content interval requirement, and treating the second EFCPWC in the water treatment arrangement in order to bring the second EFCPWC substance content within the target substance content interval requirement.

The cleaning phase water to be used in the at least one of the plurality of cleaning phases may be stored in a water tank before use in the at least one of the plurality of cleaning phases.

The device may further comprise a valve arrangement configured to direct water to the water treatment arrangement, wherein the water treatment arrangement comprises at plurality of water treatment devices each configured to remove a different substance from the first cleaning phase water and/or the second EFCPWC, and wherein the method further comprises the step of directing the first cleaning phase water and/or the second EFCPWC to the appropriate water treatment device based on the first substance content and/or the second EFCPWC substance content.

According to a second aspect of the inventive concept, these and other objects are achieved in full, or at least in part, by a device utilizing water for a group of cleaning procedures, each cleaning procedure comprising a plurality of cleaning phases each having a substance content interval requirement with respect to a number of substance levels and each using cleaning phase water having a substance content with respect to the number of substance levels, wherein the device comprises: a sensor arrangement configured to determine a first substance content of first cleaning phase water from a first cleaning phase of the cleaning procedure; a data processing device configured to receive data comprising a target substance content interval requirement of at least one of the plurality of cleaning phases, and to compare the first substance content to the target substance content interval requirement of the at least one of the plurality of cleaning phases; wherein the device is configured to form cleaning phase water to be used in the at least one of the plurality of cleaning phases by transferring the first cleaning phase water to the at least one of the plurality of cleaning phases based on the comparison.

The device may further be configured to form the cleaning phase water to be used in the at least one of the plurality of cleaning phases by transferring the first cleaning phase water to the at least one of the plurality of cleaning phases if the first substance content is within the target substance content interval requirement.

The device may further comprise an external water path in liquid communication with an external water source, wherein the device is further configured to, if the first substance content is within a first interval outside of the target substance content interval requirement, transfer the first cleaning phase water to the at least one of the plurality of cleaning phases and to combine the first cleaning phase water with external water from the external water source in order to form a first external and first cleaning phase water combination (EFCPWC), wherein the external water has a different substance content with respect to the first substance content, and wherein a first EFCPWC substance content of the first EFCPW is within the target substance content interval requirement.

The device may further comprise a water treatment arrangement, wherein the device is further configured to, if the first substance content is within a second interval outside of the target substance content interval requirement, treat the first cleaning phase water in the water treatment arrangement in order to bring the first substance content towards and/or within the target substance content interval requirement.

The device may be further configured to: if the first substance content is within a third interval outside of the target substance content interval requirement, combine the first cleaning water with external water from the external water source in order to form a second EFCPWC, wherein the external water has a different substance content with respect to the first substance content, wherein a second EFCPWC substance content of the second EFCPW is outside of the target substance content interval requirement, and to treat the second EFCPWC in the water treatment arrangement in order to bring the second EFCPWC substance content within the target substance content interval requirement.

The device may further comprise a water tank configured to store the cleaning phase water to be used in the at least one of the plurality of cleaning phases.

The device may be a washing machine.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

DETAILED DESCRIPTION

The present disclosure describes a device utilizing water for a group of cleaning procedures and related methods. Initially, some terminology may be defined to provide clarification for the following disclosure.

Throughout the present disclosure, references are made to a group of cleaning procedures. Such a group of cleaning procedures may be a number of washing programs in a washing machine. Each cleaning procedure in the group of cleaning procedure may comprise a plurality of cleaning phases. Examples of such cleaning phases include a pre-wash, a main wash, a rinsing, and the like, of a washing machine. It should be noted that a cleaning procedure may also comprise a single cleaning phase, such as e.g. a rinse.

Throughout the present disclosure, references are made to substances. The term "substance" should be interpreted to comprise a chemical element, i.e. a species of atoms, a molecule, a compound, or any combination of the same. For example, a substance may refer to a detergent, a softener, a dirt particle, fibrous matter, lipids, carbohydrates, and/or proteins. As is readily appreciated by the person skilled in the art, several other substances may be comprised within the term "substance" in the context of the present application. The substance content may be defined in a unit per volume.

With reference to substances and cleaning phases, it may be noted that different phases of a cleaning procedure are likely to comprise different substances. In particular, it may be preferably to monitor a specific substance(s) during specific a specific cleaning phase(s). For example, during a pre-wash it may be preferable to monitor the substance level of e.g. lipids, dirt, fibrous matter, or similar matter being released from e.g. a clothing. In a main wash, it may be preferable to monitor the substance level of e.g. a detergent or an active cleaning component with respect to the substance content requirement interval of the specific substance. It is to be understood that the above examples are not limiting, and that it may be preferable to monitor other substances during the cleaning phases of a cleaning procedure. In this regard, it may also be noted that the water treatment arrangement may be configured to remove a plurality of substances from cleaning phase water.

Throughout the present disclosure, for the sake of clarity, references are made to a "first cleaning phase". It is to be understood that the cleaning phase referred to as the "first cleaning phase" is not necessarily a cleaning phase initiating the cleaning procedure.

The present disclosure is mainly described in the context of a washing machine. However, as is readily appreciated by the person skilled in the art, the inventive concept may be applied to other devices utilizing water for a group of cleaning procedures, such as a shower, a dishwasher, or a car wash.

Figure 1:
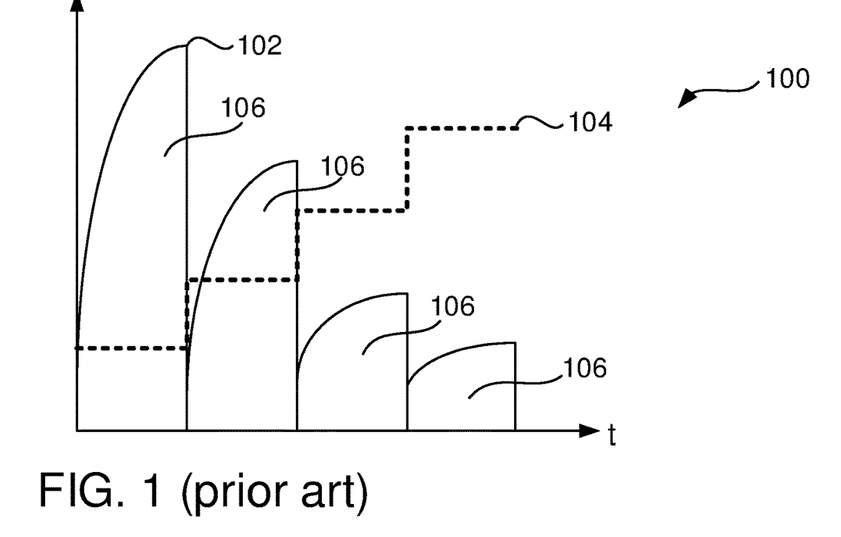
FIG. 1 schematically illustrates water parameters in a device utilizing water for cleaning procedures according to the prior art.
Figure 2:
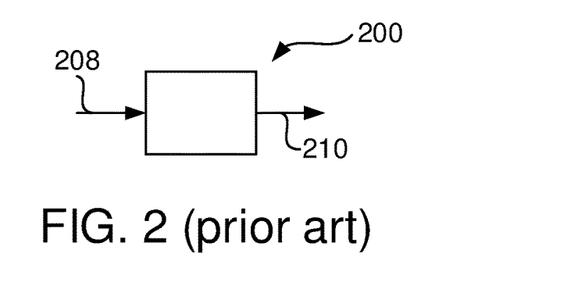
FIG. 2 schematically illustrates a device utilizing water for cleaning procedures according to the prior art.

With reference to FIGS. 1 and 2, examples of a device utilizing water for cleaning procedures, and water parameters in a device utilizing water for a cleaning procedures according to the prior art are illustrated. The graph 100 represents a level of a substance 102 in the water used in each of the phases 106 comprised in the cleaning procedure over time, and an amount of water 104 used in the cleaning procedure over time. Such a device typically withdraws a volume of fresh water from an external water inlet 208 for each of the phases 106, and subsequently, at the end of each of the phases 106, discharges the volume of water, now containing a number of substances, via a water outlet 210. Over the course of a full cleaning procedure, several volumes of water may be discharged via the water outlet 210. However, only a single volume of water is used at any one point in time for the cleaning procedure. The amount of water used 104 is often proportional to the number of phases 106.

As can be seen in FIG. 1, the level of a substance 102 in the water used in each of the phases 106 does not increase linearly over time. This may be the result of the subject being cleaned, such as a piece of clothing, initially releasing a number of substances at a higher rate compared to the end of the cleaning phase. It may also be the result of a detergent being mixed into the water used in the cleaning phase.

Figure 3:
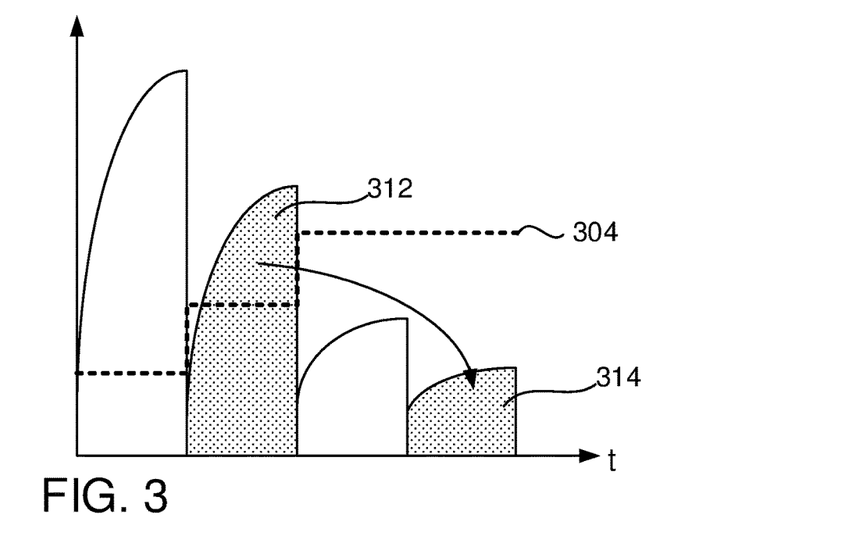
FIG. 3 schematically illustrates water parameters in a device utilizing water for a group of cleaning procedures.

Referring now to FIG. 3, the graph 300 illustrates a substance level in water used in a plurality of cleaning phases over time, and a water consumption 304 in the device over time. In general, the inventive concept is based on the realization that water from a first cleaning phase 312 can be analyzed and be reused in at least one 314 of a plurality of cleaning phases comprised in a cleaning procedure, depending on the requirement of the at least one 314 of the plurality of cleaning phases with respect to a number of substance levels. Hereby, water consumption 304 in the device may be decreased. Further, a consumption of cleaning agents, such as detergent, may be decreased by reusing water already containing such cleaning agents. In the illustrated example, water from the first cleaning phase 312 has been treated such that a substance content of the water from the first cleaning phase 312 is within a substance content requirement interval of the at least one 312 of the plurality of cleaning phases.

Figure 4:
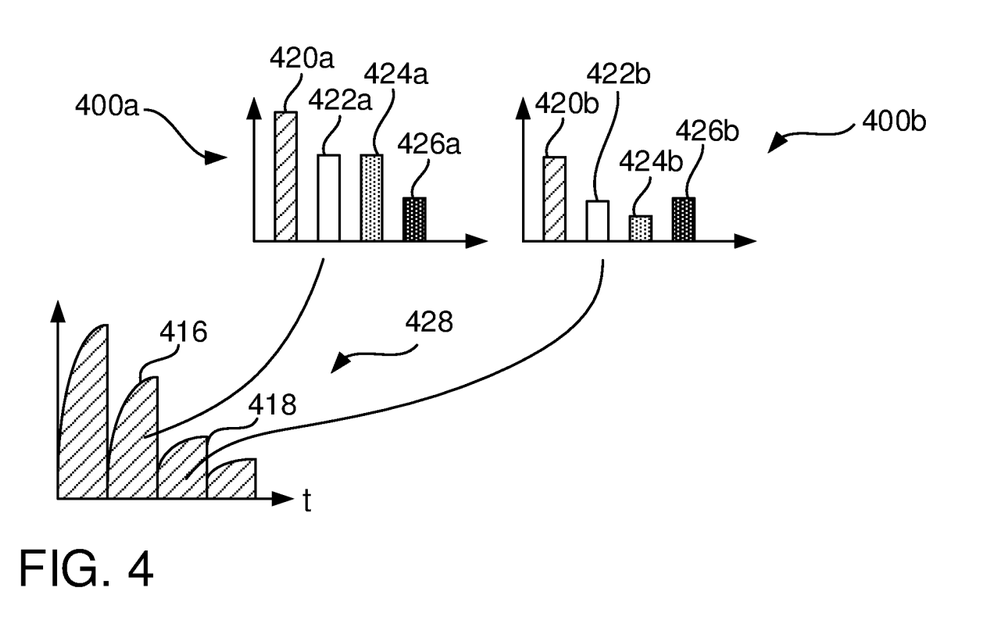
FIG. 4 schematically illustrates an example of a cleaning procedure and substance content of water used in the cleaning procedure.

Referring now to FIG. 4, an example of a cleaning procedure 428 comprising a plurality of cleaning phases will now be described. The illustrated example aims to explain the concept of a substance content of water used in the plurality of cleaning phases.

The first cleaning phase 416 may utilize cleaning phase water having a first substance content 400a with respect to a number of substance levels 420a, 422a, 424a, 426a. A second cleaning phase 428 may utilize water having a second substance content 400b with respect to a number of substance levels 420b, 422b, 424b, 426b. Here, the substance level 420a indicates a level of a first substance in water used in the first cleaning phase 416, and the substance level 420b indicates a level of the same substance in water used in the second cleaning phase 418. Similarly, the substance levels 422a, 424a, and 426a indicates a level of a specific substance respectively, and the substance levels 422b, 424b, and 426b indicates a level of the same specific substance respectively. For the sake of clarity, only the substance corresponding to substance levels 420a and 420b is shown in the graph illustrating the cleaning procedure 428. A number of substances may influence the cleaning procedure, and in particular, may influence at least one of the cleaning phases, with respect to a variety of parameters, such as energy consumption, water consumption, cleaning effectivity, and environmental impact. Similarly, some substances may not impact the cleaning procedure at all.

Figure 5:
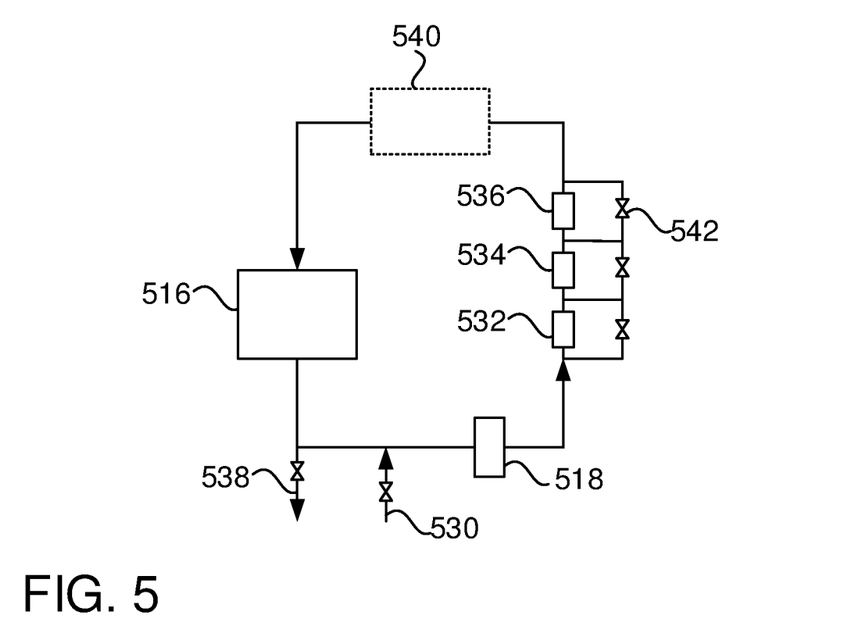
FIG. 5 schematically illustrates a device utilizing water for a group of cleaning procedures.

With reference to FIG. 5, a device utilizing water for a group of cleaning procedures according to the inventive concept will now be described. Each cleaning procedure in the group of cleaning procedures may comprise a plurality of cleaning phases each having a substance content interval requirement with respect to a number of substance levels and each using cleaning phase water having a substance content with respect to the number of substance levels. The cleaning procedure may take place in a cleaning chamber 516. Such a cleaning chamber may be a drum of a washing machine, a cleaning hall in a car wash, or the like.

The device may comprise a sensor arrangement 518 configured to determine a first substance content of first cleaning phase water from a first cleaning phase of the cleaning procedure. The sensor arrangement 518 may comprise a plurality of sensors. The sensor arrangement 518 may comprise an electrical conductivity sensor. The sensor arrangement 518 may comprise a turbidity sensor. The sensor arrangement 518 may comprise a pH sensor. The determination of the substance content of cleaning phase water by the sensor arrangement may be made at the end of the respective cleaning phase. However, it is to be understood that the sensor arrangement may determine a substance content of cleaning phase water at any point in time during the respective cleaning phases.

The device may comprise a data processing device configured to receive data comprising a target substance content interval requirement of at least one of the plurality of cleaning phases. The data comprising a target substance content interval requirement may be stored in the data processing device and/or in a remote database. The target substance content interval requirement may be determined by analysis of historical data related to cleaning procedures in the device and/or in a plurality of similar devices. The target substance content interval requirement may be determined through user input. For example, if a user is not satisfied with a cleaning procedure, he or she may provide the device with feedback through a user input interface, indicating that the cleaning procedure was not performed to satisfaction. Consequently, the target substance content interval requirement for any of the cleaning phases comprised in the cleaning procedure may be altered accordingly.

The data processing device may be configured to compare the first substance content to the target substance content interval requirement of the at least one of the plurality of cleaning phases. The device may be configured to form cleaning phase water to be used in the at least one of the plurality of cleaning phases by transferring the first cleaning phase water to the at least one of the plurality of cleaning phases based on the comparison.

With reference to the disclosures made in conjunction to FIG. 4, it is to be understood that the substance content interval requirement may refer to a number of substances. In other words, a substance content interval requirement of a cleaning phase may specify that a first substance should be within a specific interval, a second substance should be within another specific interval, and so on.

It is to be understood that the at least one of the plurality of cleaning phases may be a subsequent cleaning phase in the same cleaning procedure. However, the at least one of the plurality of cleaning phases may be a cleaning phase in another cleaning procedure. In addition, the at least one of the plurality of cleaning phases may be a cleaning phase in a cleaning procedure in another similar device.

Figure 6:
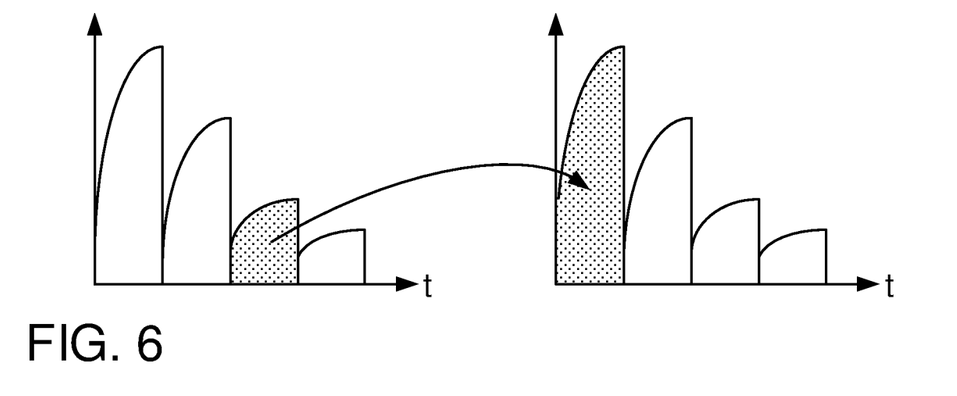
FIG. 6 schematically illustrates an example of how cleaning phase water for at least one of a plurality of cleaning phases may be formed.

The device may be configured to form the cleaning phase water to be used in the at least one of the plurality of cleaning phases by transferring the first cleaning phase water to the at least one of the plurality of cleaning phases if the first substance content is within the target substance content interval requirement. An example of such a transfer of cleaning phase water is illustrated in FIG. 6.

Figure 7:
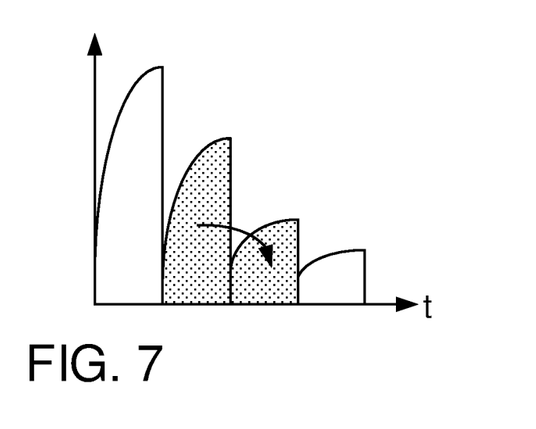
FIG. 7 schematically illustrates an example of how cleaning phase water for at least one of a plurality of cleaning phases may be formed.

The device may comprise an external water path 530 in liquid communication with an external water source. The device may be configured to transfer the first cleaning phase water to the at least one of the plurality of cleaning phases if the first substance content is within a first interval outside of the target substance content interval requirement. The device may be configured to combine the first cleaning phase water with external water from the external water source in order to form a first external and first cleaning phase water combination (EFCPWC), wherein the external water has a different substance content with respect to the first substance content, and wherein a first EFCPWC substance content of the first EFCPW is within the target substance content interval requirement. In other words, the first cleaning phase water may be diluted in order to bring the first substance content within the target substance content interval requirement. An example of such a transfer of cleaning phase water is illustrated in FIG. 7. In the illustrated example, first cleaning phase water is transferred to a subsequent cleaning phase within the same cleaning procedure. However, it is to be understood that the first cleaning phase water may be transferred to a cleaning phase not directly following the first cleaning phase. Further, the first cleaning phase water may be transferred to a cleaning phase comprised in another cleaning procedure and/or comprised in another similar device.

The device may comprise a water treatment arrangement. The device may be configured to treat the first cleaning phase water in the water treatment arrangement if the first substance content is within a second interval outside of the target substance content interval requirement, in order to bring the first substance content towards and/or within the target substance content interval requirement.

The device may be configured to, if the first substance content is within a third interval outside of the target substance content interval requirement, combine the first cleaning water with external water from the external water source in order to form a second EFCPWC, wherein the external water has a different substance content with respect to the first substance content, wherein a second EFCPWC substance content of the second EFCPW is outside of the target substance content interval requirement, and to treat the second EFCPWC in the water treatment arrangement in order to bring the second EFCPWC substance content within the target substance content interval requirement. In other words, the first cleaning phase water may be diluted and subsequently treated. It may also be possible to treat the first cleaning phase water and subsequently dilute the same with external water.

An example of such a transfer of cleaning phase water is illustrated in FIG. 7. In the illustrated example, first cleaning phase water is transferred to a subsequent cleaning phase within the same cleaning procedure. However, it is to be understood that the first cleaning phase water may be transferred to a cleaning phase not directly following the first cleaning phase. Further, the first cleaning phase water may be transferred to a cleaning phase comprised in another cleaning procedure and/or comprised in another similar device.

The water treatment arrangement may comprise a plurality of water treatment devices 532, 534, 536. Each of the plurality of water treatment devices may be configured to remove a different substance from the first cleaning phase water and/or the second EFCPWC. In other words, each of the plurality of water treatment devices may be configured to remove a respective substance from cleaning phase water, wherein each respective substance is different. For example, the water treatment arrangement may comprise a water treatment device configured to remove a detergent. The water treatment arrangement may comprise a chemical absorbent, a filter, a heat treatment, a UV treatment, or any combination of the same. As is readily appreciated by the person skilled in the art, the water treatment arrangement may comprise a water treatment device configure to remove a substance comprised in the target substance interval requirement.

The device may comprise a water tank 540 configured to store the cleaning phase water to be used in the at least one of the plurality of cleaning phases. The water tank 540 may comprise a plurality of compartments for storing a plurality of volumes of cleaning phase water to be used in the at least one of the plurality of cleaning phases. At least part of the sensor arrangement may be located in the water tank 540, such that a substance content of water in the water tank 540 can be determined. By having a water tank, cleaning phase water to be used in the at least one of the plurality of cleaning phases can be stored for later use even if the target substance content requirement is not known at the time of storage. For example, when a new cleaning procedure is about to start, the target substance content interval requirement of a cleaning phase of the new cleaning procedure can be received by the data processing device, and the substance content of the stored water can be compared to the target substance content interval requirement of a cleaning phase of the new cleaning procedure. It is to be understood that the water tank 540 need not necessarily be arranged in the device as such. In contrast, the water tank 540 may be arranged in a location separate from the device, thus forming a system comprising the device and the water tank 540.

The device may comprise a discharge path 538 configured to drain cleaning phase water from the device. The device may further be configured to drain cleaning phase water from the device if the first substance content is within a fourth interval and/or if a restricted substance is detected by the sensor arrangement. For example, if it is deemed that the water treatment arrangement cannot bring the first substance content within the target substance requirement interval of a cleaning phase, the cleaning phase water may be drained from the device. Similarly, if the cleaning phase water contains a substance that cannot be removed by the water treatment arrangement, or a substance that for any other reason is deemed to be inadequate to reuse in the at least one of the plurality of cleaning phases, the cleaning phase water may be drained from the device.

The device may comprise a valve arrangement comprising a number of valves 542 configured to restrict and allow a flow of water in the device. In particular, the number of valves 542 may be configured to direct water to the water treatment arrangement.

Figure 8:
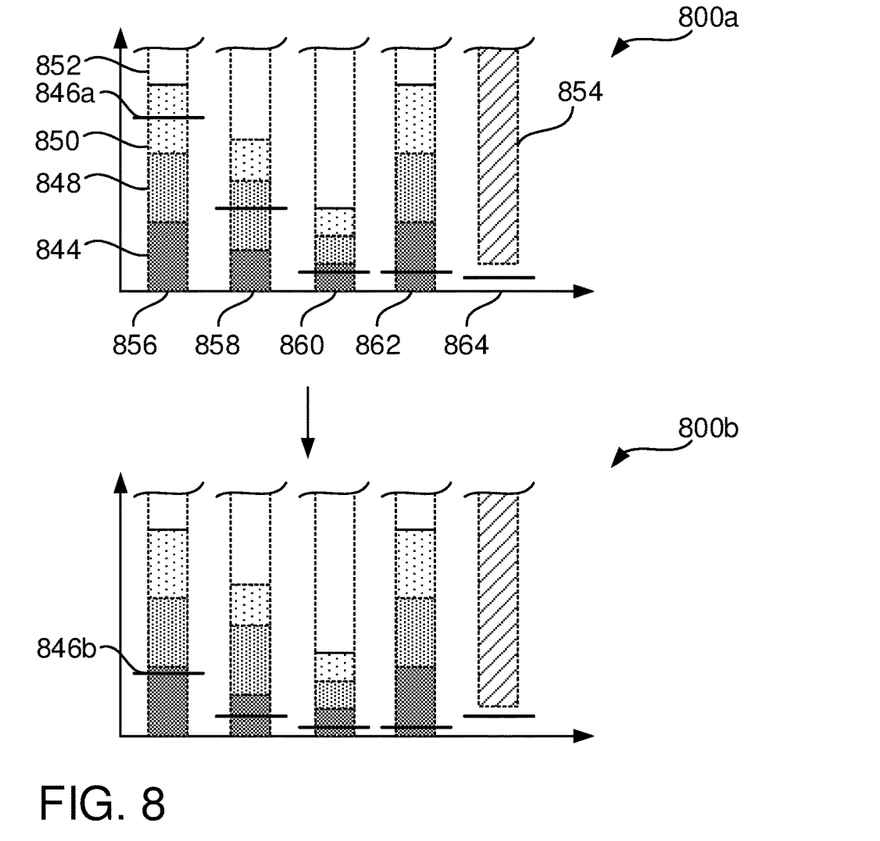
FIG. 8 schematically illustrates substance content levels and target substance content interval requirements.

Now referring to FIG. 8, substance content levels and target substance content interval requirements are illustrated. For the sake of clarity, reference signs are only provided for one of the number of substances 856, 858, 860, 862, 864 comprised in the substance content of the first cleaning phase water. A substance content of first cleaning phase water from a first cleaning phase and target substance content interval requirements for at least one of a plurality of cleaning phases are illustrated in graph 800a. The substance content may comprise a substance level 846a of a first substance 856. The first substance 856 may be associated with a target substance content interval requirement 844 in at least one of the plurality of cleaning phases. In other words, in at least one of the plurality of cleaning phases, the target substance content interval requirement with respect to the first substance 856 is illustrated by box 844. Similarly, a first interval 848, a second interval 850, a third interval 852, and a fourth interval (only shown for substance 864) outside of the target substance content interval requirement may exist with respect to the first substance 856.

As can be seen in the illustrated example, the substance level 846a with respect to the first substance 856 is within the second interval 850. Consequently, the first cleaning phase water may be combined with external water and treated in the water treatment arrangement in order to bring the substance level 846a, and thus the substance content, within the target substance content interval requirement 844. The treatment may be performed in a water treatment device configured to remove the first substance 856. The combination of external water and first cleaning phase water, and treatment, is hereafter in this example referred to as action A.

Further, a substance level with respect to a second substance 858 is within a first interval. Consequently, the first cleaning phase water may be combined with external water in order to bring the substance level with respect to the second substance 858 within the target substance content interval requirement. The combination of external water and first cleaning phase water is hereafter in this example referred to as action B.

Since the first substance level 846a is within the second interval 850, action B may not be sufficient to bring the first substance level 846a within the target substance interval requirement with respect to the first substance 856. Therefore, action A may be taken.

In graph 800b, action A has been performed, and the substance levels of the respective number of substances has decreased accordingly. In particular, the substance level 846b has been brought within the target substance content requirement interval. As can be seen, all substance levels are now within the target substance content requirement intervals for the respective number of substances. Cleaning phase water for use in the at least one of the plurality of cleaning procedures has thus been formed.

The substance content 800a and/or 800b may comprise a substance 864 having a fourth interval 854. A substance level being within the fourth interval 854 may indicate that the first cleaning phase water should be discarded via the discard path.

The substance content requirement interval may be a closed interval, an open interval, or a half-closed interval. Any of the substance content requirement interval, the first interval, the second interval, the third interval, and the fourth interval, may overlap. The substance content requirement interval may have an infinite right-hand and/or left-hand endpoint.

A system comprising a plurality of devices according to the inventive concept may be provided. The plurality of devices may be configured to run a cleaning procedure in a sequence. The sequence may depend on a substance content of cleaning phase water from a first cleaning phase of the respective cleaning procedures of the plurality of devices. In other words, the sequence in which the plurality of devices performs cleaning procedures may be arranged such that the least amount of external water and/or the least amount of water treatment is needed.

Figure 9:
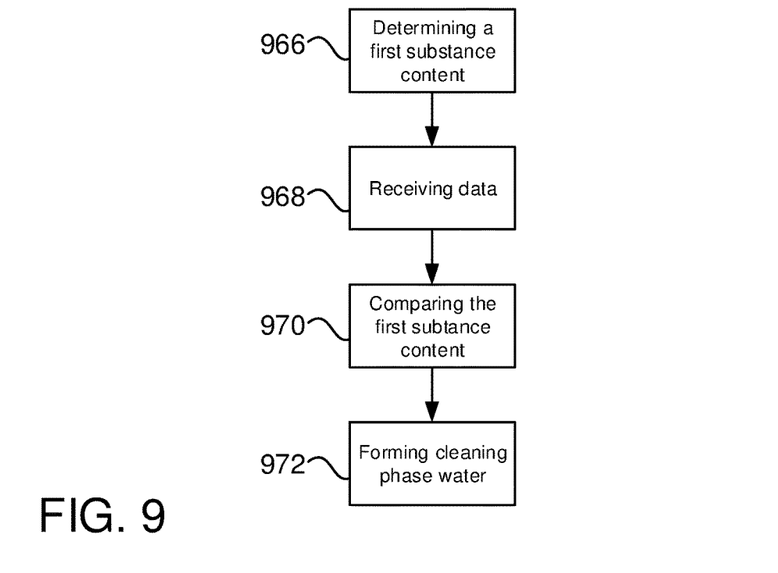
FIG. 9 is a flow chart diagram of a method for optimizing water usage in a device utilizing water for a group of cleaning procedures.

Referring now to FIG. 9, a method for optimizing water usage in a device utilizing water for a group of cleaning procedures, each cleaning procedure comprising a plurality of cleaning phases each having a substance content interval requirement with respect to a number of substance levels and each using cleaning phase water having a substance content with respect to the number of substance levels, wherein the device comprises a sensor arrangement and a data processing device, may comprise the steps of determining a first substance content 966 of first cleaning phase water from a first cleaning phase of the cleaning procedure using the sensor arrangement; in the data processing device, receiving data 968 comprising a target substance content interval requirement of at least one of the plurality of cleaning phases; in the data processing device, comparing the first substance content 970 to the target substance content interval requirement; forming cleaning phase water 972 to be used in the at least one of the plurality of cleaning phases by transferring the first cleaning phase water to the at least one of the plurality of cleaning phases based on the comparison.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF REFERENCE SIGNS

100 Graph
102 Level of substance
104 Amount of water used
106 Plurality of cleaning phases
208 Water inlet
210 Water outlet
300 Graph
304 Water consumption
312 First cleaning phase
314 One of a plurality of cleaning phases
400a First substance content
400b Second substance content
416 First cleaning phase
418 Second cleaning phase
420a Substance levels
420b "
422a "
422b "
424a "
424b "

426a "
426b "
428 Cleaning procedure
516 Cleaning chamber
518 Sensor arrangement
530 External water path
532 Water treatment device
534 "
536 "
538 Discharge path
540 Water tank
542 Number of valves
800a Substance content and target substance content interval requirement
800b "
844 Target substance content interval requirement
846a Substance level
846b Substance level
848 First interval
850 Second interval
852 Third interval
854 Fourth interval
856 First substance
858 Substance
860 Substance
862 Substance
864 Substance
966 Step of determining a first substance content
968 Step of receiving data
970 Step of comparing the first substance content
972 Step of forming cleaning phase water

The invention claimed is:

1. A method for optimizing water usage in a device utilizing water for a group of cleaning procedures, each cleaning procedure comprising a plurality of cleaning phases each having a substance content interval requirement with respect to a plurality of substance levels and each using cleaning phase water having a substance content with respect to the plurality of substance levels, wherein the device comprises a sensor arrangement, an external water path in liquid communication with an external water source, a water treatment arrangement configured to remove a plurality of substances from the cleaning phase water, and a data processing device, wherein the method comprises the steps of:
determining a first substance content with respect to a plurality of substance
levels of first cleaning phase water from a first cleaning phase of the cleaning procedure using the sensor arrangement;
in the data processing device, receiving data comprising a target substance content interval requirement with respect to a plurality of substance levels of each subsequent cleaning phase of the plurality of cleaning phases, wherein the target substance content interval requirement of at least two different subsequent cleaning phases are different from each other;
in the data processing device, comparing the first substance content to each target substance content interval requirement; and
forming cleaning phase water to be used in at least one subsequent cleaning phase of the plurality of cleaning phases by transferring the first cleaning phase water to the at least one subsequent cleaning phase of the plurality of cleaning phases based on the comparison, wherein the forming further comprises the sub-steps of:
if the first substance content is within a first interval outside of the target substance content interval requirement, combining the first cleaning water with external water from the external water source in order to form a first external and first cleaning phase water combination (first EFCPWC), wherein the external water has a different substance content with respect to the first substance content, and wherein a first EFCPWC substance content of the first EFCPWC is within the target substance content interval requirement,
if the first substance content is within a second interval outside of the target substance content interval requirement, treating the first cleaning phase water in the water treatment arrangement in order to bring the first substance content towards and/or within the target substance content interval requirement, and
if the first substance content is within a third interval outside of the target substance content interval requirement, combining the first cleaning water with external water from the external water source in order to form a second EFCPWC, wherein the external water has a different substance content with respect to the first substance content, and wherein a second EFCPWC substance content of the second EFCPW is outside of the target substance content interval requirement, and treating the second EFCPWC in the water treatment arrangement in order to bring the second EFCPWC substance content within the target substance content interval requirement.

2. The method according to claim 1, wherein the first cleaning phase water is transferred to the at least one subsequent cleaning phase of the plurality of cleaning phases if the first substance content is within the target substance content interval requirement.

3. The method according to claim 1, wherein the cleaning phase water to be used in the at least one subsequent cleaning phase of the plurality of cleaning phases is stored in a water tank before use in the at least one subsequent cleaning phase of the plurality of cleaning phases.

4. The method according to claim 1, wherein the device further comprises a valve arrangement configured to direct water to the water treatment arrangement, wherein the water treatment arrangement comprises a plurality of water treatment devices each configured to remove a different substance from the first cleaning phase water and/or the second EFCPWC, and wherein the method further comprises the step of directing the first cleaning phase water and/or the second EFCPWC to an appropriate water treatment device of the plurality of water treatment devices based on the first substance content and/or the second EFCPWC substance content.

5. A device utilizing water for a group of cleaning procedures, each cleaning procedure comprising a plurality of cleaning phases each having a substance content interval requirement with respect to a plurality of substance levels and each using cleaning phase water having a substance content with respect to the number of substance levels, wherein the device comprises:
a sensor arrangement configured to determine a first substance content with respect to a plurality of substance levels of first cleaning phase water from a first cleaning phase of the cleaning procedure; and
a data processing device configured to receive data comprising a target substance content interval requirement with respect to a plurality of substance levels of each subsequent cleaning phase of the plurality of cleaning phases, wherein the target substance content interval requirement of at least two different subsequent cleaning phases are different from each other, and to compare the first substance content to each target substance content interval requirement of the at least one of the plurality of cleaning phases wherein the device is configured to form cleaning phase water to be used in at least one subsequent cleaning phase of the plurality of cleaning phases by transferring the first cleaning phase water to the at least one subsequent cleaning phase of the plurality of cleaning phases based on the comparison.

6. The device according to claim 5, wherein the device is further configured to form the cleaning phase water to be used in the at least one subsequent cleaning phase of the plurality of cleaning phases by transferring the first cleaning phase water to the at least one subsequent cleaning phase of the plurality of cleaning phases if the first substance content is within the target substance content interval requirement.

7. The device according to claim 5, wherein the device is a washing machine.

8. The method according to claim 1, wherein the first substance content includes the plurality of substance levels of corresponding substances in the first cleaning phase water, wherein the corresponding substances are different from one another.

\* \* \* \* \*